Figure 1:
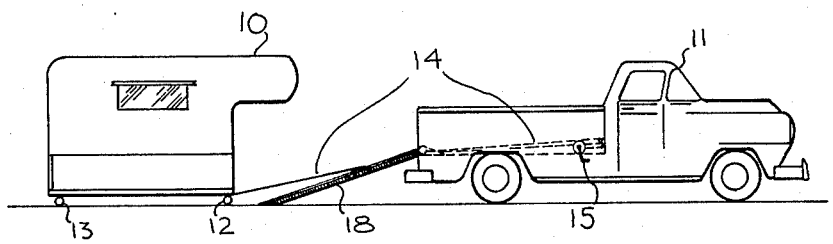

Nov. 1, 1960 J. MILHEM 2,958,432
TRAILER APPARATUS

Filed Oct. 16, 1958 2 Sheets-Sheet 1

JAMES MILHEM
INVENTOR.

BY Allen E. Botney

AGENT

Nov. 1, 1960

J. MILHEM 2,958,432

TRAILER APPARATUS

Filed Oct. 16, 1958

2 Sheets-Sheet 2

JAMES MILHEM
INVENTOR.

BY Allen E. Botney

AGENT

United States Patent Office 2,958,432
Patented Nov. 1, 1960

2,958,432

TRAILER APPARATUS

James Milhem, 10915 Etiwanda Ave., Northridge, Calif.

Filed Oct. 16, 1958, Ser. No. 767,735

5 Claims. (Cl. 214—84)

The present invention relates in general to trailers and more particularly to apparatus for facilitating the raising and lowering of trailers to and from, respectively, the back of a truck.

One familiar type of trailer used for camping purposes is hitched onto the back of an automobile or truck and pulled along by the vehicle. Another type of camping trailer is mounted upon the back of a truck and transported in "piggy-back" fashion, the truck generally being of such a size that the trailer and truck together form a unit.

With respect to the latter type of trailer, it has been and still is the practice to mount the trailer on the truck by first raising the trailer to the proper truck level at the rear of the truck and then pushing the trailer in a sliding fashion onto the truck. This obviously requires the combined efforts of several men, generally four.

More specifically, with the aid of three or four men, the trailer, which is quite bulky and heavy, is lifted at each of its four corners and a jack inserted thereunder. The technique then involves raising the trailer by means of the several jacks and when the appropriate height is attained, the trailer is slowly and carefully pushed onto the truck.

It will be recognized that such a technique is not only difficult but also dangerous to those who employ it. Thus, each jack must be raised only a little bit at a time in order to at all times maintain the trailer on as even a keel as possible for to do otherwise, that is, to raise any one jack a considerable extent above the others, would cause the trailer to incline to one side with the possible result that it may either slide off the jacks or topple over, thereby endangering those around it. Accordingly, of necessity, the jacking up of the trailer is a painstakingly slow affair. Moreover, at the present time, the full use of the truck is lost to its owner once the trailer is on the truck. More particularly, when on a camping trip or in the open field, the trailer cannot be lowered to the ground in view of the fact that it takes the efforts of several persons to accomplish this result. In consequence thereof, the trailer must remain on the truck which is thereby lost to general transportation purposes.

It is, therefore, an object of the present invention to provide apparatus to facilitate the raising and lowering of trailers to and from, respectively, the back of a truck.

It is another object of the present invention to provide apparatus with the aid of which a single person may raise and lower a trailer to and from, respectively, the back of a truck.

It is a further object of the present invention to provide apparatus to expedite and simultaneously substantially reduce the danger involved in the raising and lowering of trailers to and from, respectively, the back of a truck.

The disadvantages encountered in the prior art for raising and lowering trailers are substantially reduced if not entirely eliminated by the present invention which does so by uniquely combining the principles of the pulley, inclined plane and roller. More particularly, according to an embodiment of the present invention, rollers are suitably mounted on the underside of the trailer intermediate its front and rear ends. Consequently, the trailer may be rolled from one place to another.

A pulley system is mounted on the back of the truck, the end of the wire or rope used for the pulley being fastened to the forward end of the trailer. The trailer is raised to the back of the truck by rolling the trailer up an incline with the aid of the pulley system, the incline being supported in its inclined position by having one end coupled to the rear end of the truck. By reversing the procedure, the trailer may be lowered to the ground. Novel means are provided at the juncture between the incline and the truck to facilitate and expedite getting the trailer on and off the back of the truck.

From the above delineation, it will be recognized that the present invention makes it possible for a single person to operate the raising and lowering of the trailer rather than the three or four persons previously needed. A natural result is that the truck may now be freed for other uses than that of transporting and carrying the trailer. Thus, while on a camping trip and in the open field, the trailer may be readily lowered to the ground and the truck put to other uses. Furthermore, the elimination of the jacks makes it possible to raise and lower the trailer quickly and safely.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only and are not intended as a definition of the limits of the invention.

Figure 2:
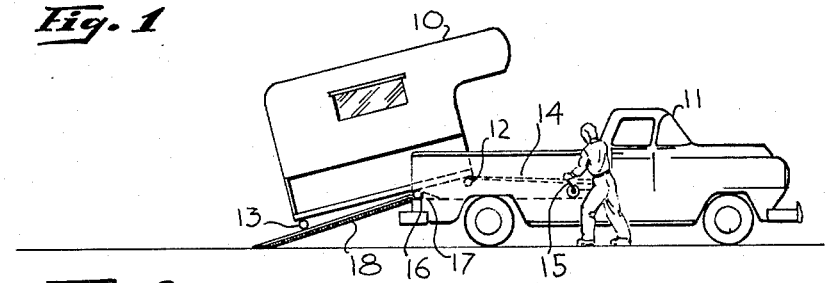
Figure 3:
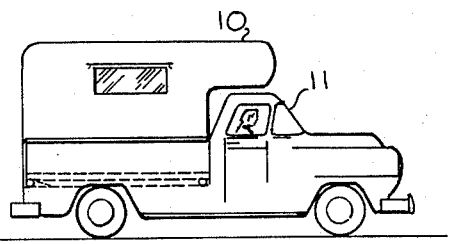
Figure 7:
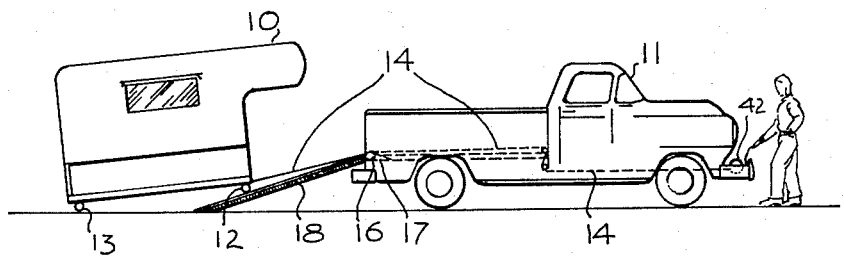
Figure 4:
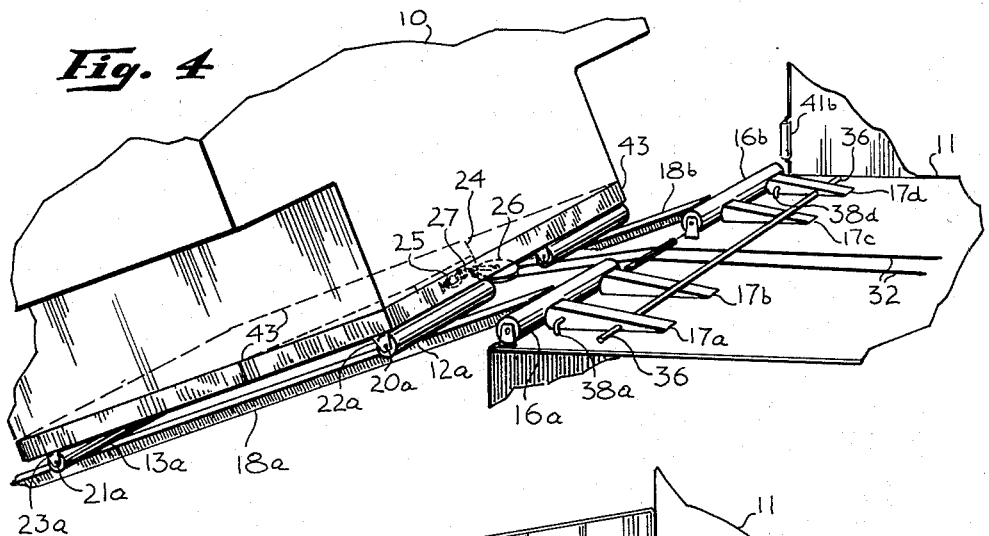
Figure 5:
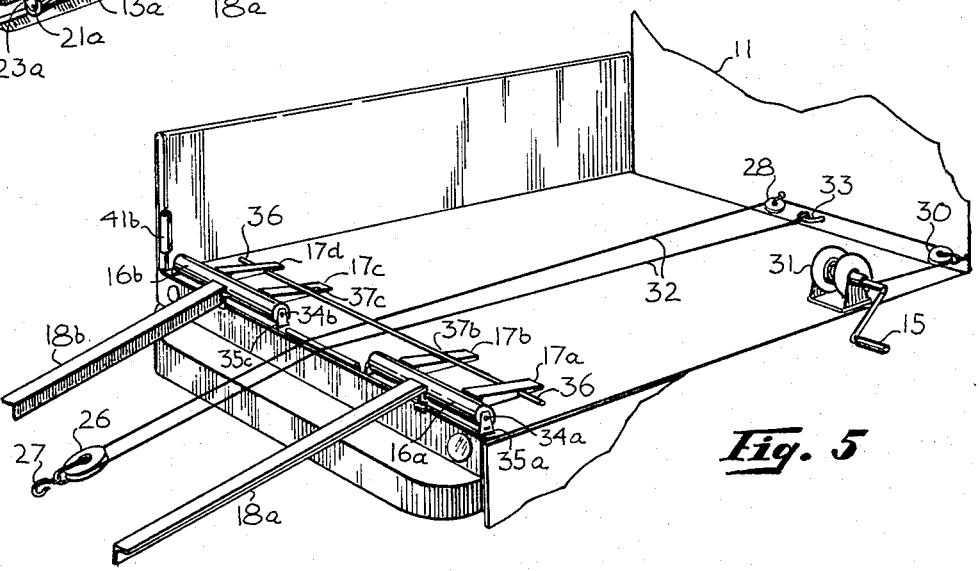
Figure 6:
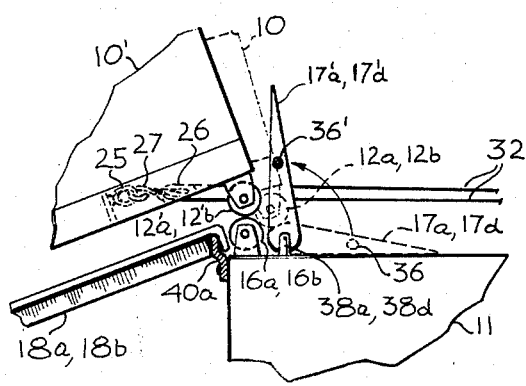

Figures 1 to 3 inclusive broadly illustrate one embodiment of the present invention and the steps involved in its operation;

Figures 4 to 6 inclusive show the embodiment of Figures 1 to 3 and its operation in much finer detail; and Figure 7 broadly illustrates another embodiment of the present invention.

Referring now to the drawings wherein like parts are designated throughout with like numerals, particular reference is made to Figures 1 to 3 wherein are shown a trailer 10 of the type to which the present invention has application and a truck 11 upon which the trailer may be mounted. Two sets of rollers 12 and 13 are mounted on the underside of trailer 10 between the forward and rear ends of the trailer, preferably as close as possible to these ends as shown in the referred-to figures. Although it is not essential, rollers 12 and 13 are preferably cylindrically shaped with a shift (not shown in Figures 1 to 3 due to the size of the drawings) running longitudinally through the center of each, the rollers being rotatable about their respective shafts. Accordingly, with the aid of rollers 12 and 13, trailer 10 may be rolled from one place to another. The shafts may be supported at their ends by means of sturdy plates which are suitably mounted or fastened to the trailer, the plates also not being shown here for sake of clarity. On the underside of trailer 10 there is also mounted some means by which a pulley system may be linked or coupled to the trailer. This means may take the form of a steel plate bolted to the trailer and a hook or ring sturdily mounted on the plate. A plate and ring of the type mentioned are shown in later drawings and will be mentioned further in connection with the description of the operation presented below.

A pulley system, generally designated 14, is mounted on the back part of truck 11, the system being operated by means of a crank 15 which is preferably mounted on one side of the truck. The crank is mechanically coupled to the pulley apparatus and is adapted to be locked in position at any point in its arc, thereby preventing further operation of the above-said pulley system.

Also mounted on the rear part of truck 11 and included in the apparatus of the present invention is another set of rollers 16 and a set of blocks 17 that are preferably of triangular shape, the rollers and blocks being more clearly shown in Fig. 2. Rollers 16 are also mounted on shafts about which they are respectively rotatable and are positioned as close as possible to the rear edge of the truck for reasons that will be presented and understood later. Triangular blocks 17 are mounted on truck 11 in front of rollers 16 and in close proximity thereto, the hypotenuse sides of the blocks facing upward and oriented in such a manner that they incline downward away from rollers 16. Figure 2 shows this condition which will be more fully shown and discussed below.

Completing the apparatus shown in brief in Figs. 1, 2 and 3 is an incline 18 which is preferably a pair of bars. The bars may be made of iron, steel or other strong material, the only requirement being that they be strong enough to support the full weight of trailer 10. Bars 18 are coupled at one end to the back of truck 11 and at the other end are resting on the ground, the coupling to the truck preferably being accomplished by curving or hooking the truck ends of bars 18 and fitting these ends into a pair of slots provided for them in the back end of the truck. The slots and the hooked ends of bars 18 fitting therein are shown with greater clarity in a subsequent figure of the drawings.

Considering now in general the steps involved in raising trailer 10 to the back of truck 11 and in lowering the trailer therefrom, the pulley system is first attached to the hook or ring on the plate mounted beneath the trailer. The step of attaching the pulley system is specifically shown in Fig. 1. Once attachment has been made, crank 15 is unlocked and turned in the proper direction. As a result, trailer 10 is pulled toward the truck which causes it to roll on rollers 12 and 13 toward and up inclined bars 18. Continued turning of crank 15 forces trailer 10 to roll to the top of bars 18 and, with the aid of rollers 16 and blocks 17, onto truck 11. This latter situation is illustrated in Figure 2 wherein the trailer is shown moving from the bars onto the truck. Several more turns of the crank and the trailer is fully on the truck and held in place as is shown in Figure 3. At this point, bars 18 may be removed from their respective slots and stored in a space provided for them, available for future use.

To lower trailer 10 to the ground, the trailer is pushed toward bars 18 with one arm while crank 15 is turned in the opposite direction than before with the other arm, in consequence of which the wires of the pulley system become relaxed, that is, less taut. As a result, trailer 10 rolls backward toward and onto bars 18. When trailer 10 is almost entirely off truck 11, the portion remaining on the truck is, with the aid of blocks 17, assisted over rollers 16 and off the truck in a manner that will be described below. Once trailer 10 is entirely on bars 18, the trailer slowly rolls down the bars of its own accord restrained, however, by the pulley system which is let out at a rate determined by the speed with which crank 15 is turned. The trailer continues down bars 18 until it is on the ground, at which point it stops and the pulley system disconnected.

For a more complete understanding of the apparatus of the present invention and its operation, reference is made to Figures 4, 5 and 6 wherein the apparatus is shown in greater detail. In Figure 4, a pertinent portion of trailer 10 is shown with the two sets of rollers, previously designated 12 and 13, mounted thereunder. As seen, each set of rollers comprises two individual rollers and, for sake of clarity, the two rollers of set 12 are designated 12a and 12b and the two rollers of set 13 are designated 13a and 13b. The shafts upon which the rollers are rotatably mounted are clearly shown in Figure 4. The shafts for rollers 12a and 13a, for example, are designated 20a and 21a, respectively. Similarly, the plates supporting these shafts are also clearly shown in Figure 4, the plates used in supporting shafts 20 and 21a being designated 22a and 23a, respectively. The inclined bars upon which trailer 10 is supported, previously designated 18, are here designated 18a and 18b.

Trailer 10 is held in position on bars 18a and 18b by the pulley arrangement which is mounted atop truck 11 and which is coupled or fastened to the trailer by means of a plate rigidly mounted on the trailer's underside. The actual coupling or fastening may be achieved by means of a strong ring or hook extending from the plate which is designated 24. A ring is shown in Figure 4 and is designated 25. However, any suitable device other than a ring or hook may be used as well.

The pulley system and associated apparatus are clearly shown in Figures 4 and 5 and, as shown, comprises a pulley 26 having a hook 27 integral therewith and extending outwardly therefrom in the plane of the pulley, a pair of guide wheels 28 and 30, a roller 31, crank 15, a strong sturdy length of wire 32, and a device 33 for rigidly clamping down one end of the wire. With respect to wheels 28 and 30 and roller 31, wheel 28 is preferably mounted in the center of the back part of the truck, behind the cab of the truck, wheel 30 is preferably mounted in one of the corners nearest wheel 28, and roller 31 is preferably mounted along the side of the truck nearest wheel 30. Device 33 is rigidly mounted on truck 11 preferably alongside wheel 28 and crank 15 is mechanically linked to roller 31 through the side of the truck, the side not being shown in Figures 4 and 5 for sake of clarity. Wire 32 is firmly clamped down at one end by device 33, the remaining length of wire being wound on pulley 26, wheels 28 and 30, and roller 31. Wheels 28 and 30 act as frictionless guides for the wire.

The set of rollers mounted at the rear edge of truck 11, previously designated 16, is shown to also comprise two rollers which, for sake of clarity, are designated 16a and 16b in Figures 4 to 6. Rollers 16a and 16b are rotatively mounted on shafts 34a and 34b, respectively, the shafts, in turn, being supported at their ends by plates, the two plates that are visible in the drawings being designated 35a and 35c. Mounted in front of rollers 16a and 16b are a plurality of triangular shaped blocks which were generally designated 17 earlier. The number of blocks thus mounted is preferably four although a fewer or greater number of such blocks, designated 17a—17d, may be utilized.

It is the function of rollers 16a and 16b and blocks 17a—17d to facilitate getting trailer 10 onto and off truck 11. More specifically, bars 18a and 18b and truck 11 form an angle at their juncture and because of it the trailer would, in the absence of rollers 16a and 16b, catch either on the bars or on the rear edge of the truck once rollers 12a and 12b had passed beyond this juncture so that the trailer was no longer being supported by both sets of rollers 13a, 13b and 12a, 12b. Any such catching of the trailer would naturally prevent the trailer from being raised any further onto truck 11 by the pulley system. The position that trailer 10 must be in for it to catch is substantially the position of the trailer shown in Fig. 2. Rollers 16a and 16b prevent the trailer from catching. Instead, the trailer rests on rollers 16a and 16b when not supported by rollers 12a and 12b with the result that the trailer may continue to be raised with ease by the pulley system.

Considering now blocks 17a—17d, once rollers 13a and 13b have passed beyond rollers 16a and 16b so that trailer 10 is completely on truck 11, inclined blocks 17a—17d help to ease down the rear end of the trailer. Without the blocks, the rear end of the trailer would fall substantially the full height of both rollers 13a, 13b and 16a, 16b, a condition that is preferably avoided. Blocks 17a—17d have further beneficial uses which will be presented below.

Considering blocks 17a—17d still further, two of the blocks, namely, blocks 17a and 17d, have holes through them for their full width, the holes being large enough in diameter to permit a rod 30 therethrough of a predetermined diameter. It will be obvious that blocks 17a and 17d were arbitrarily selected and that any two or more of the four blocks could be used to accommodate the rod therethrough. The other two blocks, namely, blocks 17b and 17c, have grooves 37b and 37c, respectively, cut out of their upper surfaces, the grooves being deep enough to permit rod 36 to lie in them flush with the surface of the blocks, as shown in the figures. Accordingly, rod 36 does not run through blocks 17b and 17c but merely rests upon them in the grooves provided.

In addition, blocks 17a and 17d are hinged at their ends closest to rollers 16a and 16b, the hinges being designated 38a and 38d, respectively. Hinges 38a and 38d are clearly shown in Figure 4. Thus, in the event rod 36 is pulled in an upward direction, blocks 17a and 17d will rotate in an upward direction about their respective hinges 38a and 38d.

The importance of rod 36 and blocks 17a, 17d, and the importance of the rotatability of these elements about hinges 38a and 38d, may be seen from Figure 6 wherein the position of trailer 10 is shown both before and after blocks 17a and 17d and rod 36 have been rotated. More specifically, prior to such rotation the trailer is designated 10, the blocks are designated 17a and 17d, the rod is designated 36, and the rollers mounted beneath the trailer are designated 12a and 12b. In their positions following rotation, the trailer is designated 10', the blocks 17a' and 17d', the rod 36', and the rollers 12a' and 12b'.

In lowering the trailer to the ground, a point is reached whereat rollers 12a and 12b are positioned in the space between blocks 17a—17d and rollers 16a and 16b. As a result and because of the spacing between rollers 16a and 16b and the blocks, rollers 12a and 12b are somewhat below the level of the top of rollers 16a and 16b, as shown in Figure 6. In other words, a point is reached in the downward motion of trailer 10 whereat rollers 12a and 12b hit against rollers 16a and 16b so that rollers 16a and 16b are, in this situation, an impediment to the continued downward movement of trailer 10. Stated in a still different manner, it may be said that trailer 10 is, in a sense, hanging on rollers 16a and 16b. Thus by lifting up on rod 36 until it is in the position shown by rod 36', thereby rotating blocks 17a and 17d into the positions of blocks 17a' and 17d', rollers 12a and 12b are forced over the hurdle of rollers 16a and 16b, as shown by the position of rollers 12a' and 12b'. The trailer may now continue to be easily lowered down bars 18a and 18b to the ground, the pull of gravity assisting in its downward motion.

It should be noted that the problem of getting rollers 12a and 12b over rollers 16a and 16b may be surmounted to some extent, if not completely, by making the diameters of rollers 12a and 12b considerably larger than the spacing between rollers 16a, 16b and blocks 17a—17d. It should also be noted that the coupling of bars 18a and 18b to truck 11 is clearly shown in Figure 6, the device forming the slot for bar 18a being designated 40a. Finally, it should be noted that rollers may be mounted on the inside of the truck sides for the purpose of guiding the trailer while it is in motion and also to prevent the trailer from scraping the sides of the truck. One such roller device is shown in Figures 4 and 5 mounted on the far side of truck 11 and is designated 41b.

Referring now to Figure 7, there is shown therein another embodiment of the present invention. In this embodiment, a winch 42 mounted on the front of truck 11 and operated by the truck motor is substituted for crank 15 and roller 31 in Figures 1 to 6. Furthermore, differently than in the first embodiment, wire 32 now extends from winch 42 beneath and through the truck to pulley 26. In other respects, the two embodiments are substantially the same.

It was previously mentioned that coupling between the pulley system and the trailer was achieved by means of a plate (plate 24 in Fig. 4) mounted on the trailer's underside and to which a ring was fastened. Although the use of a plate has proven quite satisfactory, it may nevertheless be deemed advisable, because of the large weight of the trailer, to distribute the pulling force exerted by the pulley system on the trailer over the entire area of the trailer rather than over the relatively small area covered by the plate. To produce such a force distribution, a metal frame may be mounted entirely around the trailer along its bottom edges, as is illustrated by the frame designated 43 in Fig. 4. Where such a frame is used, the ring to which the pulley is linked may be supported by means of a cross-brace mounted between the frame sides.

Having thus described the invention, what is claimed as new is:

1. Apparatus for raising and lowering a trailer to and from, respectively, the back of a truck, said apparatus comprising: rollers mounted beneath the trailer on the underside thereof to permit the trailer to roll; a pair of inclined bars coupled at one end to the rear of the truck and resting on the ground at the other end; a pulley system mounted on the truck and attachable to the trailer, said system being adapted to roll the trailer up said inclined bars and onto the truck and down said bars to the ground; at least one additional roller mounted on the truck along its rear edge; at least one triangular-shaped block mounted on the truck in front of said additional roller and oriented so as to slope downwardly therefrom, said block being hinged at the end closest to said additional roller and rotatable toward said additional roller about said hinge; and means for rotating said block about said hinge.

2. The apparatus defined in claim 1 wherein said means includes a rod coupled to said block by means of a hole therethrough and through which said rod extends, said rod being operable in response to a torque applied thereto to rotate said block about its hinge.

3. Apparatus for raising and lowering a trailer to and from, respectively, the back of a truck, said apparatus comprising: rollers mounted beneath the trailer to permit the trailer to roll from one place to another; a pair of inclined bars coupled at one end to the rear of the truck and resting on the ground at the other end; means mounted on the trailer to which a pulley may be coupled; a pulley having a hook integral with and extending therefrom for coupling said pulley to said means; a cable wound on and through said pulley; a device for firmly holding down one end of said cable; a crank mechanism coupled to the other end of said cable, the trailer being rolled up said bars onto the truck and down said bars to the ground in response to the operation of said crank mechanism; a pair of roller devices for guiding the trailer between the sides of the truck and for expediting and facilitating movement of the trailer therebetween, at least one such device being mounted on each of the two truck sides; at least one additional roller mounted on the truck along its rear edge; at least one triangular-shaped block mounted on the truck in front of said additional roller and oriented so as to slope downwardly therefrom, said block being hinged at the end closest to said additional roller and rotatable toward said additional roller about said hinge; and means for rotating said block about said hinge.

4. The apparatus defined in claim 3 wherein said means includes a rod coupled to said block by means of a hole therethrough and through which said rod extends, said rod being operable in response to a torque applied thereto to rotate said block about its hinge.

5. Apparatus for raising and lowering a trailer to and from, respectively, the back of a truck, said apparatus comprising: first and second pairs of rollers mounted beneath the trailer along the front and rear ends thereof, respectively, to permit the trailer to roll; a pair of inclined bars coupled at one end to the rear of the truck and resting on the ground at the other end; a pulley system mounted on the truck and attachable to the trailer, said system being adapted to roll the trailer up said inclined bars and onto the truck and down said bars to the ground; a third pair of rollers mounted on the truck along its rear edge for assisting in the movement of the trailer onto and off the truck; and means mounted adjacent said third pair of rollers for easing said second pair of rollers onto the truck from the top of said third pair of rollers when the trailer is raised to the back of the truck and for lifting said first pair of rollers over said third pair of rollers when the trailer is lowered to the ground.

References Cited in the file of this patent
UNITED STATES PATENTS

| | | |
|---|---|---|
| 1,078,947 | O'Hara | Nov. 18, 1913 |
| 2,305,762 | Cristofoletti et al. | Dec. 22, 1942 |
| 2,789,715 | Filipoff et al. | Apr. 23, 1957 |